United States Patent
Kuesel et al.

(10) Patent No.: US 9,176,885 B2
(45) Date of Patent: Nov. 3, 2015

(54) COMBINED CACHE INJECT AND LOCK OPERATION

(75) Inventors: Jamie R. Kuesel, Rochester, MN (US); Mark G. Kupferschmidt, Rochester, MN (US); Paul E. Schardt, Rochester, MN (US); Robert A. Shearer, III, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 13/355,613

(22) Filed: Jan. 23, 2012

(65) Prior Publication Data

US 2013/0191600 A1 Jul. 25, 2013

(51) Int. Cl.
*G06F 13/00* (2006.01)
*G06F 12/08* (2006.01)
*G06F 13/28* (2006.01)

(52) U.S. Cl.
CPC ............ *G06F 12/0888* (2013.01); *G06F 13/28* (2013.01)

(58) Field of Classification Search
CPC combination set(s) only.
See application file for complete search history.

(56) References Cited

U.S. PATENT DOCUMENTS

| | | | |
|---|---|---|---|
| 5,555,393 A | 9/1996 | Tanaka et al. | |
| 5,664,150 A * | 9/1997 | Isaac et al. | 711/143 |
| 7,565,494 B1 * | 7/2009 | Todd et al. | 711/137 |
| 2001/0001873 A1 * | 5/2001 | Wickeraad et al. | 711/136 |
| 2004/0162946 A1 | 8/2004 | Day et al. | |
| 2005/0027943 A1 | 2/2005 | Steere et al. | |
| 2006/0179174 A1 * | 8/2006 | Bockhaus et al. | 710/22 |
| 2008/0010414 A1 * | 1/2008 | Kailas et al. | 711/133 |
| 2008/0010415 A1 * | 1/2008 | Sawdey et al. | 711/136 |
| 2009/0037666 A1 | 2/2009 | Rahman et al. | |
| 2009/0144505 A1 * | 6/2009 | Auemhammer et al. | 711/128 |
| 2009/0157978 A1 | 6/2009 | Gregg et al. | |
| 2009/0282197 A1 * | 11/2009 | Comparan et al. | 711/142 |
| 2010/0070717 A1 | 3/2010 | Arimilli et al. | |
| 2010/0153650 A1 | 6/2010 | Guthrie et al. | |
| 2010/0185819 A1 | 7/2010 | Heil et al. | |
| 2010/0268896 A1 * | 10/2010 | Arimilli et al. | 711/146 |
| 2011/0314227 A1 | 12/2011 | Blake et al. | |

OTHER PUBLICATIONS

International Search Report and Written Opinion of the ISA dated May 2, 2013—International Application No. PCT/IB2012/057141.

* cited by examiner

*Primary Examiner* — Charles Rones
*Assistant Examiner* — Han Doan
(74) *Attorney, Agent, or Firm* — Middleton Reutlinger

(57) ABSTRACT

A circuit arrangement and method utilize cache injection logic to perform a cache inject and lock operation to inject a cache line in a cache memory and automatically lock the cache line in the cache memory in parallel with communication of the cache line to a main memory. The cache injection logic may additionally limit the maximum number of locked cache lines that may be stored in the cache memory, e.g., by aborting a cache inject and lock operation, injecting the cache line without locking, or unlocking and/or evicting another cache line in the cache memory.

24 Claims, 9 Drawing Sheets

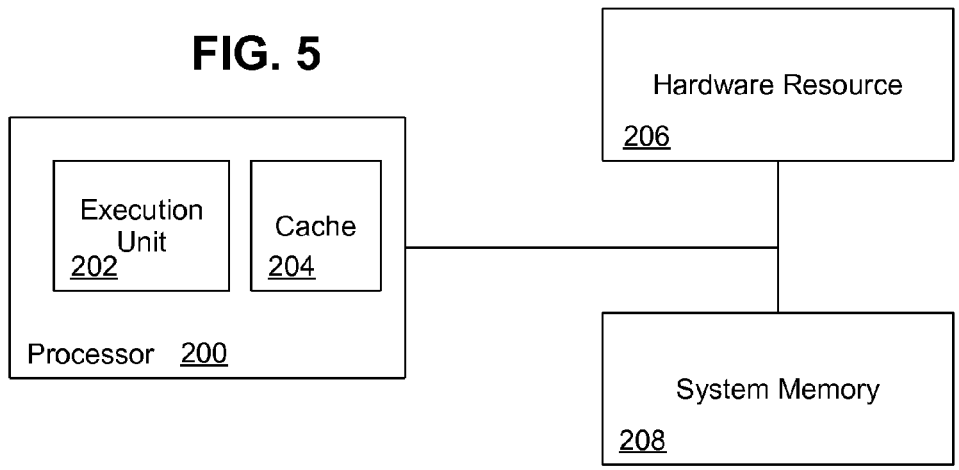
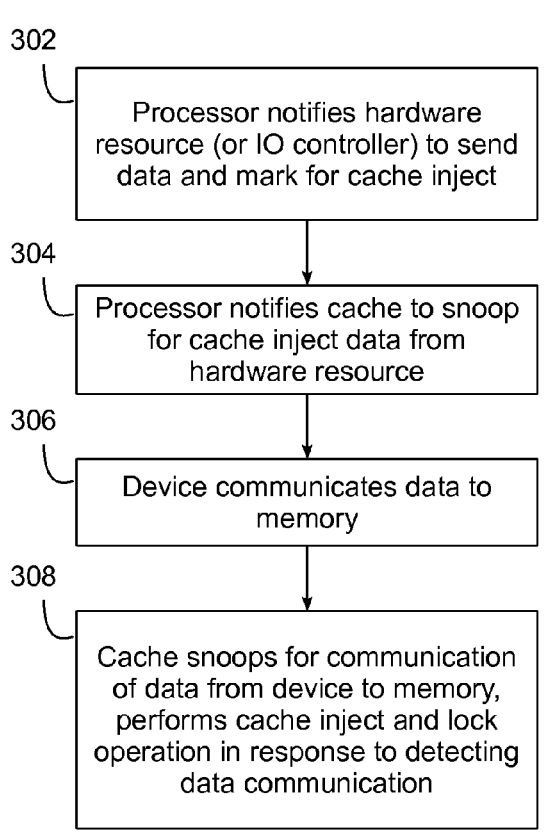

COMBINED CACHE INJECT AND LOCK OPERATION

FIELD OF THE INVENTION

The invention is generally related to data processing, and in particular to processor architectures and cache memories utilized thereby.

BACKGROUND

Conventional data processing systems typically rely on multi-level memory architectures to optimize access to data by microprocessors and other processing units. With a multi-level memory architecture, multiple levels of memories are provided, with each successive level of memory typically providing greater storage space but increased access latency. The highest level memories, which provide the lowest access latency but the smallest amount of storage space, are commonly referred to as cache memories, and are often integrated directly into a processing unit or disposed on the same integrated circuit device, or chip. One common memory architecture used in a data processing system that includes multiple processing units, for example, supplements a single shared main memory with one or more L1 caches and an L2 cache dedicated to each processing unit, an L3 cache that is shared by multiple processing units.

A multi-level memory architecture relies on spatial and temporal locality of data to minimize memory access latencies. Put another way, processing units typically and repeatedly access data located in similar regions of a memory address space. Therefore, by maintaining data that a particular processing unit needs to use in the highest level cache accessible by that processing unit, the amount of time required to retrieve that data is minimized. In contrast, whenever a processing unit attempts to access data that is not located in a cache memory, that access attempt is considered to "miss" the cache memory, and a performance penalty is incurred as the data is retrieved from a lower level of memory. Subsequent accesses to that data will then typically "hit" the cache memory, and the amount of time required to access the data will be reduced.

To facilitate the movement of data between different levels of memory, the data is typically organized into fixed size segments referred to as "cache lines." Given the limited storage space in a cache memory, a cache memory desirably only stores cache lines that are currently being used, or likely to be used in the near future, by a processing unit. Moreover, whenever a new cache line needs to be stored in a cache memory that is already full, a cache line that is already stored in the cache memory will need to be replaced ("evicted"). Generally, an evicted cache line is written back to a main memory and/or one or more lower levels of cache memory if the cache line has been modified by the processing unit. Otherwise, if the evicted cache line has not been modified, the evicted cache line may simply be discarded.

Conventional data processing systems often support an ability to stream data from an I/O device or other such hardware resource. This streamed data is typically communicated from the hardware device to a main memory of the data processing system over a shared bus, and one or more processing units then retrieve the data from the memory as it is needed. Particularly when the processing units are also coupled to the same shared bus, the communication of data from the I/O device to the main memory, and then from the main memory to the processing units, can occupy excessive bandwidth on the bus, and lead to decreased performance.

In an effort to alleviate these concerns, some conventional data processing systems support operations referred to as cache inject operations, where data that is being communicated from a hardware resource to a main memory is concurrently "injected" into a cache memory for immediate use by an associated processing unit. By doing so, the incoming data may be accessed and processed more quickly by the processing unit, while often reducing traffic on the shared bus.

However, while injecting cache into a cache memory of a processing unit may increase processing efficiency in some implementations, cache inject operations are often somewhat speculative in nature since the associated cache lines are not specifically requested by a processing unit in association with the processing unit attempting to access such cache lines. Given the limited amount of storage space in cache memories, and competition for this limited storage space, it has been found that in some instances injected cache lines may be prematurely evicted from the cache memory before the cache line is processed, and as a result, processing units that later attempt to access such prematurely evicted cache lines will experience cache misses and thus lower performance as the cache lines are re-retrieved from the main memory.

Therefore, a continuing need exists in the art for a manner of managing cache injection in cache memory of a processing unit to reduce the likelihood of premature eviction of injected cache lines.

SUMMARY OF THE INVENTION

The invention addresses these and other problems associated with the prior art by utilizing "cache inject and lock" operations to automatically lock cache lines being injected into a cache memory, and thereby restrict injected cache lines from being evicted prior to being used by a processing unit. In addition, some embodiments of the invention desirably manage the cache memory and locked cache lines therein to reserve a portion of the cache memory for normal use and a portion for cache injection use.

In some embodiments of the invention, data communications to a main memory (e.g., a non-cache memory) coupled to a processing unit may be monitored to identify cache lines targeted for injection into a cache memory associated with the processing unit. In some embodiments, communicated cache lines may be tagged with a cache injection indicator that signals that the cache line may be injected into the cache memory. In other embodiments, a particular hardware resource communicating the data to the main memory may include a source identifier that indicates that the data originated from the particular hardware resource, so that the determination of whether a respective cache line may be injected is based at least in part on the included source identifier.

In addition, in some embodiments, cache injection logic may manage cache line injection to limit the number of cache lines that may be injected and locked in a cache memory. In some embodiments, cache injection logic may maintain a lock counter that is incremented when a cache line is injected and locked, and decremented when a cache line is unlocked (such as after the cache line has been processed by a processing unit).

Furthermore, some embodiments of the invention implement eviction prioritization such that locked cache lines may be evicted from the cache memory in response to a cache line of a higher priority needing to be injected and locked in the cache memory. In some embodiments, cache injection may evict a least recently used locked cache line so that a new cache line may be injected and locked, while in other embodiments, a locked cache line may be evicted based on a prioritization of lock indicators. In some embodiments, a cache memory may maintain a source identifier associated with each locked cache line, and cache injection logic may evict a locked cache line based on the source identifiers of each locked cache line.

Therefore, consistent with one aspect of the invention, a method may be provided for storing data in a processing unit including an execution unit and a cache memory coupled to the execution unit, where the cache memory is configured to store a plurality of cache lines. The method may include, in response to detecting communication of a respective cache line to a first memory coupled to the processing unit, determining whether to inject and lock the respective cache line in the cache memory, and, in response to determining to inject and lock the respective cache line in the cache memory, performing a cache inject and lock operation using cache injection logic coupled to the cache memory to inject the respective cache line in the cache memory and lock the respective cache line.

These and other advantages and features, which characterize the invention, are set forth in the claims annexed hereto and forming a further part hereof. However, for a better understanding of the invention, and of the advantages and objectives attained through its use, reference should be made to the drawings, and to the accompanying descriptive matter, in which there is described exemplary embodiments of the invention.

BRIEF DESCRIPTION OF THE DRAWINGS

FIG. 5 is a block diagram illustrating a data processing system configured to support cache inject and lock operations consistent with the invention.

FIG. 7 is a flowchart illustrating a sequence of operations that may be performed to configure the data processing system of FIG. 5 to stream data from a hardware resource to a main memory and perform cache inject and lock operations in association therewith.

It should be understood that the appended drawings are not necessarily to scale, presenting a somewhat simplified representation of various preferred features illustrative of the basic principles of embodiments of the invention. The specific features consistent with embodiments of the invention disclosed herein, including, for example, specific dimensions, orientations, locations, sequences of operations and shapes of various illustrated components, will be determined in part by the particular intended application, use and/or environment. Certain features of the illustrated embodiments may have been enlarged or distorted relative to others to facilitate visualization and clear understanding.

DETAILED DESCRIPTION

Embodiments of the invention provide a circuit arrangement and method for performing cache inject and lock operations that inject, and automatically lock, cache lines in a cache memory. In some embodiments, cache injection logic associated with a cache memory manages injection and locking of cache lines, such that a portion of the cache memory may be reserved for normal operation and a portion of the cache memory may be reserved for cache injection and locking. Embodiments of the invention may manage over-lock conditions, where a maximum number of locked cache lines are stored in a cache memory, and a new cache line may be injected and locked. In some embodiments, the new cache line may not be injected and locked, and instead the new cache line may be written solely to a main memory, thereby effectively aborting the cache inject and lock operation. In some embodiments, the new cache line may be injected into the cache memory without locking the new cache line, thereby effectively converting the cache inject and lock operation into a cache inject operation. In some embodiments, a locked cache line may be evicted and/or unlocked based on prioritization of locked cache lines such that the new cache line may be injected and locked. As such, some embodiments of the invention implement cache injection and locking in a cache memory with configurable management of the cache memory via the cache injection logic.

Other variations and modifications will be apparent to one of ordinary skill in the art. Therefore, the invention is not limited to the specific implementations discussed herein.

Hardware and Software Environment

Figure 1:
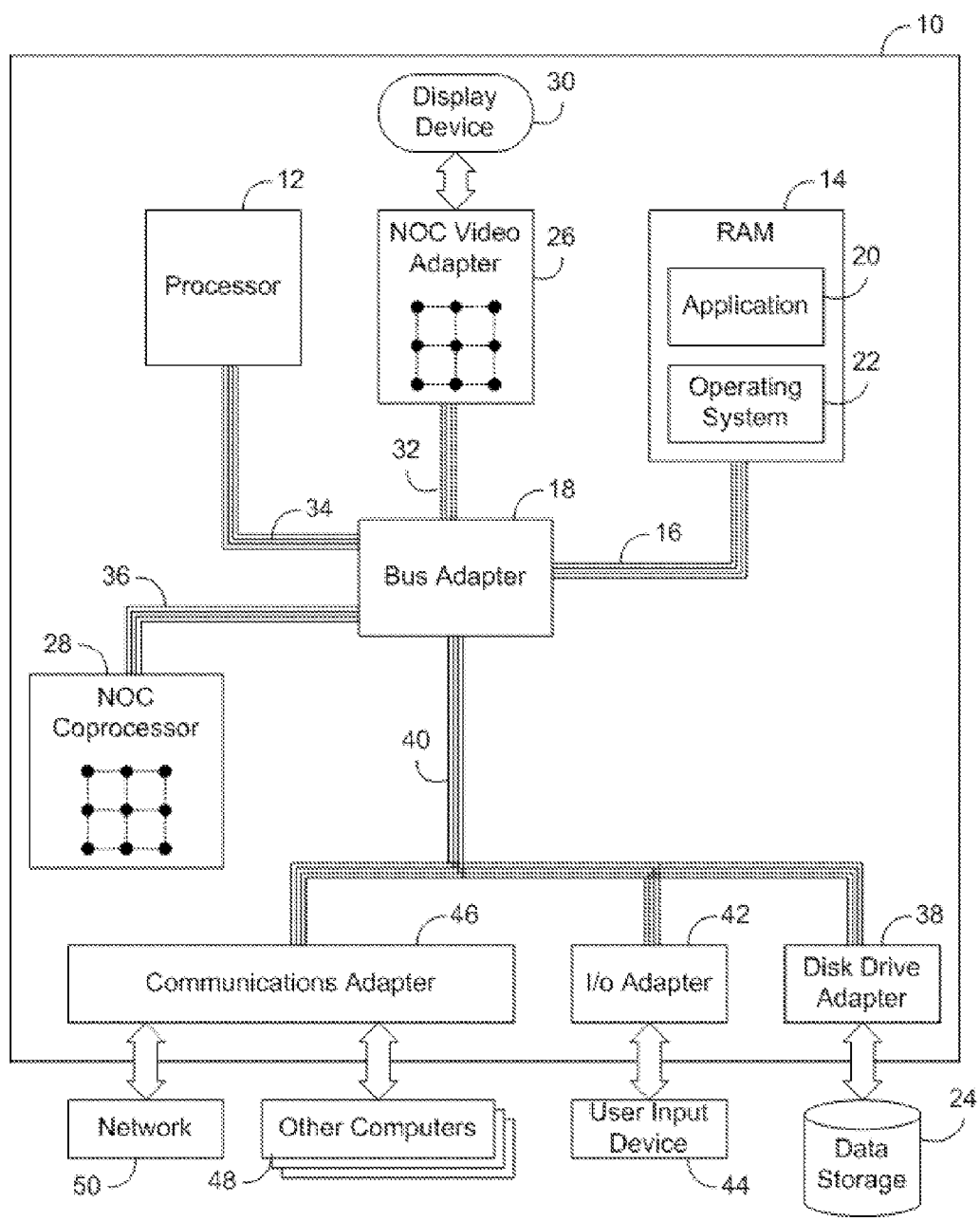
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
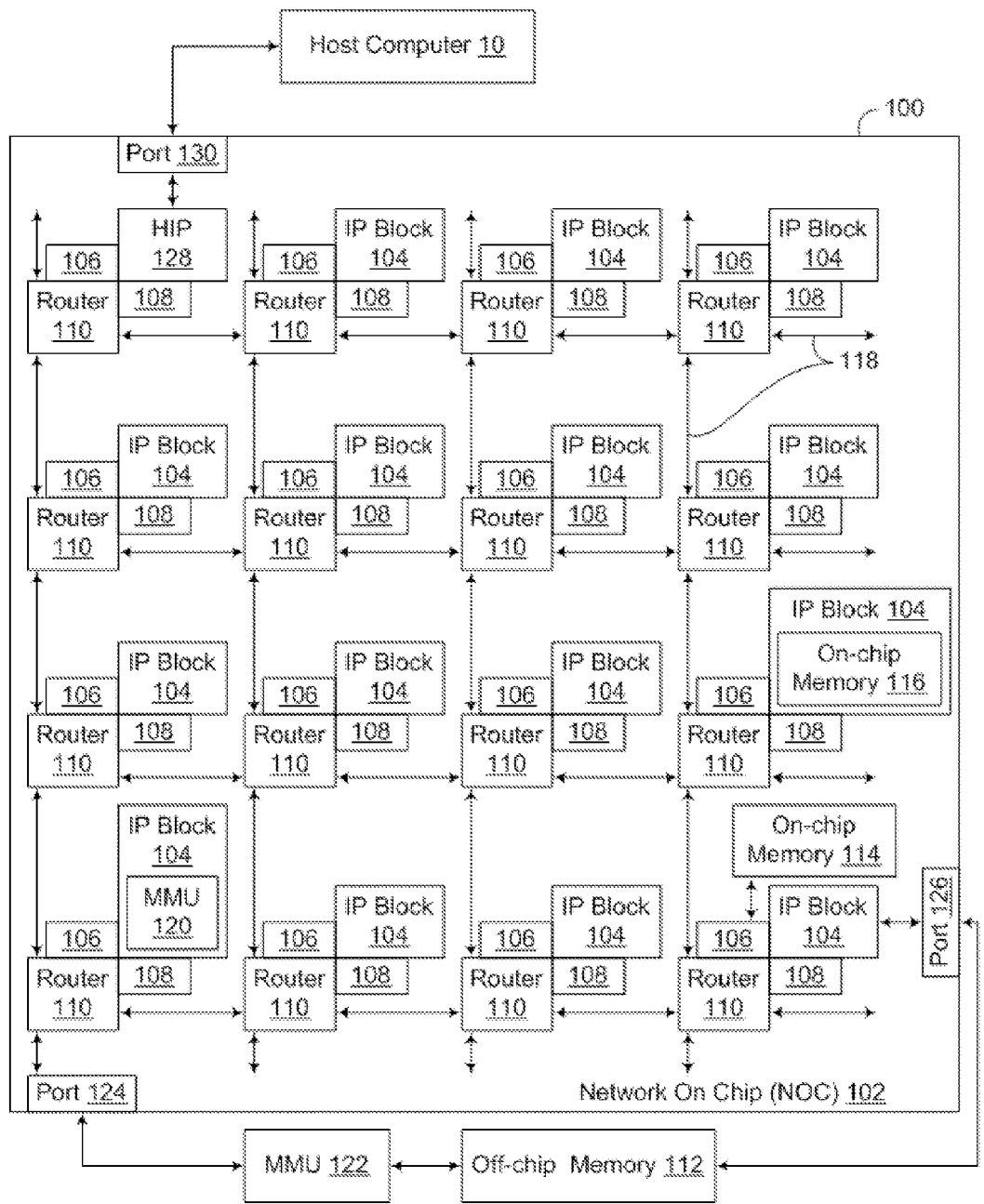
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP block's logical-function, analogous to an assembly-code listing for a high-level program application. NOCs also may be implemented, for example, in synthesizable form, described in a hardware description language such as Verilog or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices, data processing systems utilizing such devices, and other tangible, physical hardware circuits, those of ordinary skill in the art having the benefit of the instant disclosure will appreciate that the invention may also be implemented within a program product, and that the invention applies equally regardless of the particular type of computer readable storage medium being used to distribute the program product. Examples of computer readable storage media include, but are not limited to, physical, recordable type media such as volatile and nonvolatile memory devices, floppy disks, hard disk drives, CD-ROMs, and DVDs (among others).

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
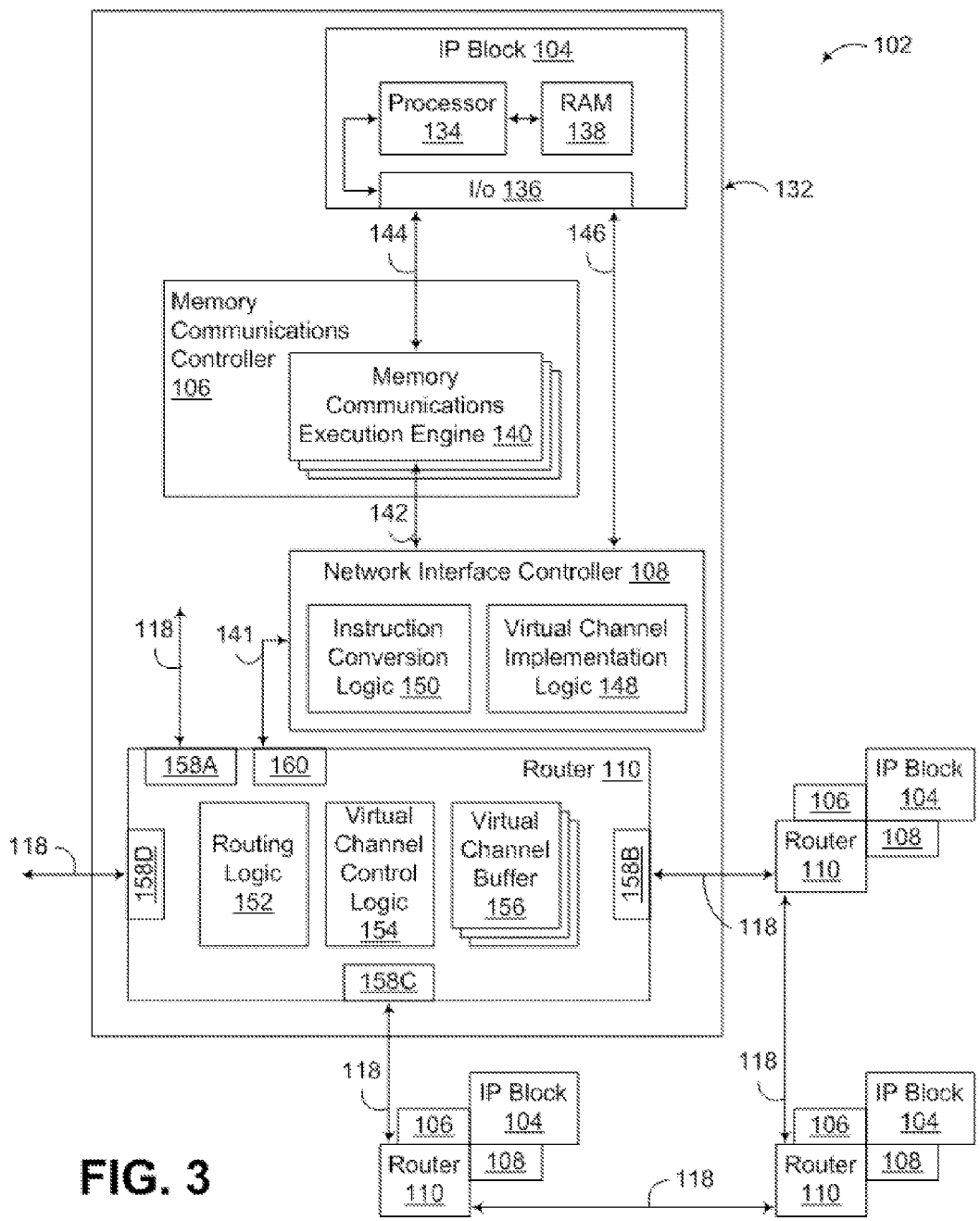
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132 which may be referred to as a node or a hardware thread. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
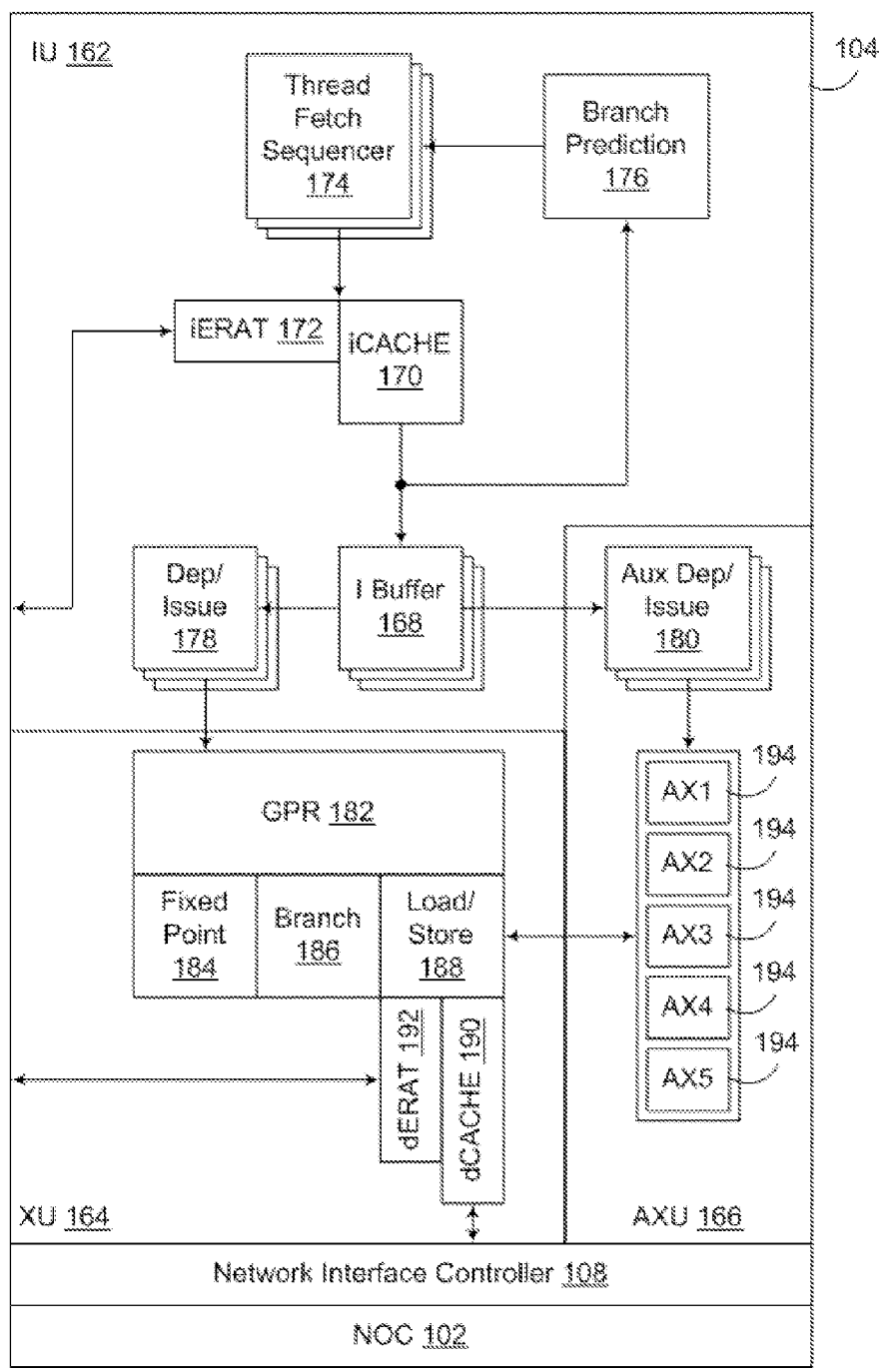
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b PowerPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Configurable Cache Inject and Lock for Cache Memory

A processing unit including a cache memory and execution unit consistent with embodiments of the invention injects cache lines into the cache memory from data being communicated to a memory coupled to the processing unit. For example, streaming workloads often write data from an I/O device to main memory with the intent to process the data in the near future. In this example, cache lines included in the data may be injected into the cache memory for processing, and the injected lines may be locked such that the cache lines are not evicted, or cast out, prior to being used. Advantageously, facilitating cache injection of the streaming workload and locking cache lines of the streaming workload may reduce memory bandwidth requirements as the cache lines are injected to the cache memory in parallel with storing the cache lines in the main memory, such that the cache lines are not retrieved from the main memory for processing. Moreover, in some embodiments, based on the cache lines, the communicated data, and/or the hardware resource generating the communicated data, cache line injection and locking may be managed by cache injection logic coupled to the cache memory such that higher priority cache lines are injected and locked in the cache memory while lower priority cache lines are evicted and/or unlocked.

Turning now to FIG. 5, this figure illustrates an exemplary processor 200 or processing unit including an execution unit 202 and a cache memory 204, e.g., an L2 cache, consistent with embodiments of the invention. A hardware resource 206 and a main memory 208 may be coupled to the processor 200 and/or each other. In some embodiments of the invention, the processor 200, the hardware resource 206, and the main memory 208 may be interconnected via a shared system bus of a computing system, such that data may be communicated over the system bus between the processor 200, the hardware resource 206, and/or the main memory 208. A hardware resource, in this regard, may include, for example, a packet processor handling streams of data from a cell phone antenna. As another example, a hardware resource may be implemented as an inline decompression or encryption engine that takes data off of a network interface and streams it to a processor. A hardware resource may also refer to an IP block or node streaming data over a NOC to another IP block or node, effectively streaming data from the cache of one node to that of another. Other implementations of hardware resources will be appreciated by one of ordinary skill in the art having the benefit of the instant disclosure.

As such, in embodiments consistent with the invention, data communicated from the hardware resource to the main memory 208 is analyzed to determine whether to inject and lock one or more cache lines included in the data into the cache memory 204 of the processor 200. Determining whether to inject and lock the cache lines may be based, for example, at least in part on a cache inject indicator included in the data, a source identifier corresponding to the hardware resource 208, and/or a state of the cache memory 204.

Figure 6:
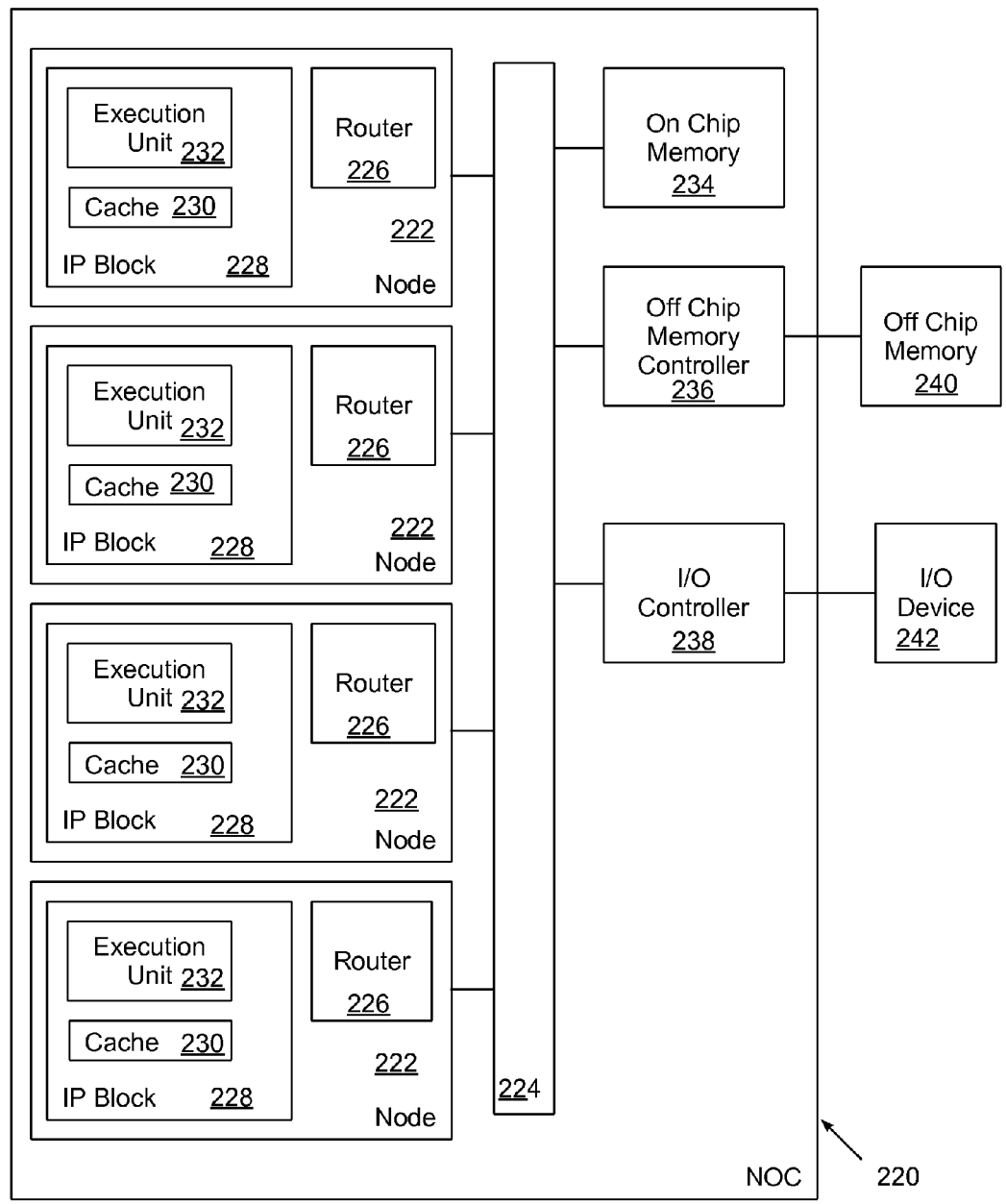
FIG. 6 is a block diagram illustrating an exemplary plurality of nodes that may be implemented using the NOC of FIG. 2 and configured to support cache inject and lock operations consistent with the invention.

It will be appreciated that a hardware resource, cache memory and main memory may be coupled to one another in a number of different manners consistent with the invention. For example, in lieu of a shared bus as is used in the data processing system of FIG. 5, FIG. 6 illustrates an exemplary NOC processor 220 including a plurality of nodes 222 coupled to one another via an on-chip network 224. As shown, each node 222 includes a router 226 for communicating data over the on-chip network 224 and an IP block 228, and each IP block includes a cache memory 230 and an execution unit 232. In addition, the NOC includes an on chip memory 234, an off chip memory controller 236, and an I/O controller 238 coupled to the on-chip network 224. As shown, the off-chip memory controller 236 is coupled to an off chip memory 240, such that data may be communicated to and from the off-chip memory 240 over the on-chip network 224 via the off-chip memory controller 236. Similarly, the I/O controller 238 is coupled to an I/O device 242, such that data may be communicated to and from the I/O device over the on-chip network via the I/O controller 238.

As such, in some embodiments of the invention, a respective cache memory 230 of a respective IP block 228 may analyze data communicated from the I/O device 242 to the off-chip memory 240 and/or the on-chip memory 234 to determine whether one or more cache lines of the communicated data may be injected and locked in the respective cache 230. Moreover, consistent with embodiments of the invention, the I/O controller 238 and/or I/O device 242 may be configured by the NOC processor 220 to communicate data for injection in a respective cache memory 230. In addition, the NOC processor 220 may notify the respective cache memory 230 to snoop data communicated from the I/O device to the on-chip memory 234 and/or the off-chip memory 240 for cache lines to inject and lock. As such, when data is communicated from the I/O device 242 to the off-chip memory 240 or the on-chip memory 234, a respective cache memory 230 may analyze the data to determine whether to inject and lock cache lines included in the communicated data.

FIG. 7 provides a flowchart 300 which illustrates a sequence of operations that may be performed by a processing unit (i.e., processor) and/or cache memory such that cache lines included in data communicated from a hardware resource to a main memory may be selectively injected and locked in the cache memory. Initially, it may be desirable for a processor to configure the hardware resource and/or cache memory to perform an injectable data transfer operation, e.g., to stream data that will be concurrently stored in a main memory and injected into a cache memory. A processor notifies an I/O controller and/or a hardware device connected to the I/O controller to communicate data to a memory and to mark or tag the data for cache injection (block 302). The processor also notifies cache injection logic associated with a cache memory to snoop data communicated from the hardware device to the memory for cache lines to inject into the cache memory (block 304). As such, when the device communicates data to the memory (block 306), the cache injection logic associated with the cache memory snoops the data and performs a cache inject and lock operation on cache lines included in the communicated data (block 308).

It should be appreciated that a device and/or cache memory may be configured in different manners to handle cache inject and lock operations consistent with the invention. For example, it may be desirable in some embodiments to support both cache inject and cache inject and lock operations, and as such it may be desirable to notify or configure a device to additionally mark or tag its communications to indicate whether the data should be locked when injected into a cache memory. It may also be desirable to notify or configure a cache memory to either lock injected cache lines or leave the cache lines unlocked. Locking of cache lines may be configurable for only certain devices (e.g., based upon source identifier) or certain types of data in some embodiments. In other embodiments, it may be desirable to only support cache inject and lock operations, such that all injectable data will be locked as a default condition.

Figure 8:
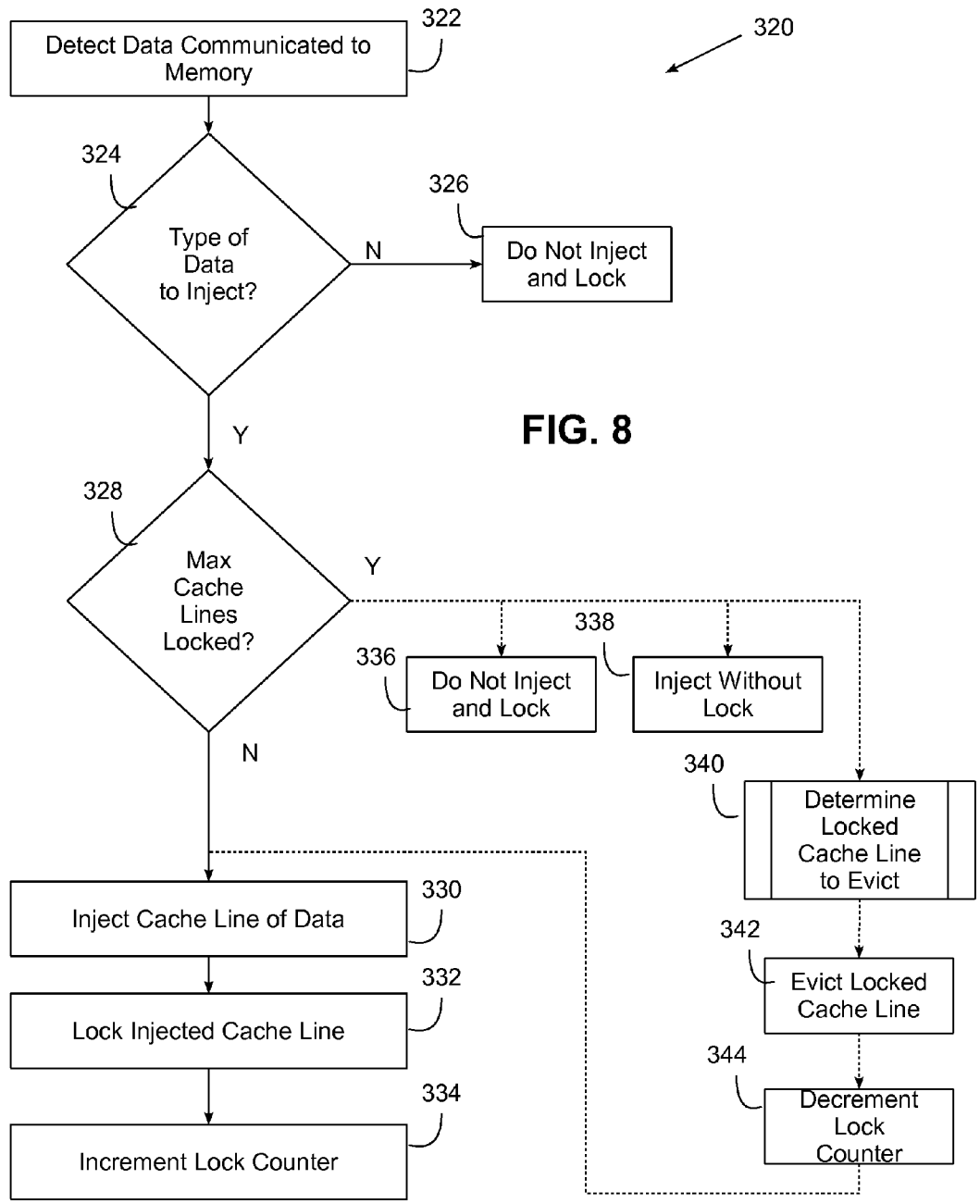
FIG. 8 is a flowchart illustrating a sequence of operations that may be performed by the processing unit of FIG. 5 to selectively inject and lock data into a cache memory associated with the processing unit.

FIG. 8 provides a flowchart 320 which illustrates a sequence of operations that may be performed by cache injection logic associated with a cache memory of a processor to selectively inject and lock cache lines included in the cache memory. The cache injection logic detects data communicated to a memory coupled to the processor (block 322), e.g., via snooping a memory bus, and the cache memory and/or data are analyzed to determine whether to inject and lock cache lines included in the data. The cache injection logic determines whether the data is appropriate for injection (block 324). In some embodiments, the communicated data may include an injection enable indicator indicating that the data may be injected. In some embodiments, the data may include a source identifier indicating a source hardware resource from which the data is being communicated, and the cache injection logic may determine whether the data is appropriate for injection based on the source identifier.

In response to determining that the data is not of the type to inject ("N" branch of block 324) (e.g., the data does not include a valid source identifier, or the data does not include an injection indicator indicating that the data may be injected), the data is not injected and locked in this cache memory (block 326). Notably, since the data is being communicated to the main memory, the communication still completes, and the data is written into the memory. Also, it will be appreciated that different processors in the same data processing system may be snooping the same communications at the same time, so even if one processor decides to not inject the data into its cache memory, another processor may decide to do so.

In response to determining that the data is of the type for injection ("Y" branch of block 324), the cache injection logic analyzes the cache memory to determine whether a maximum number of cache lines are locked in the cache memory (block 328). It may be desirable in some embodiments for the cache injection logic to manage the cache memory and injection and lock operations such that a portion of the cache memory is reserved for normal operation (i.e., not utilized in inject and lock operations). Hence, the cache injection logic analyzes the cache memory to make sure that a cache line may be injected and locked in the cache memory.

In response to determining that the maximum number of cache lines are not locked in the cache memory ("N" branch of block 328), a respective cache line from the communicated data may be injected into the cache memory (block 330), and the injected cache line may be locked (block 332). In some embodiments, the cache memory may maintain an injection lock indicator for each cache line stored in the cache memory, where the injection lock indicator may indicate whether the cache line is locked, and in these embodiments locking an injected cache line may include the cache injection logic setting the injection lock indicator in response to injecting the cache line. Furthermore, the cache injection logic may maintain an associated lock counter, where the lock counter indicates how many cache lines stored in the cache memory are locked. As such, in response to injecting and locking a cache line, the cache injection logic may increment the lock counter (block 334).

In response to determining that the maximum number of cache lines are locked in the cache memory ("Y" branch of block 328), in some embodiments, the cache injection logic may indicate that a respective cache line from the communicated data cannot be injected and locked (block 336), and the respective cache line may be written to the memory without injecting the respective cache line in the cache memory. In other embodiments, in response to determining that the maximum number of cache lines are locked in the cache memory ("Y" branch of block 328), the respective cache line may be injected into the cache memory without locking the respective cache line (block 338).

In some other embodiments, in response to determining that the maximum number of cache lines are locked in the cache memory ("Y" branch of block 328), the cache injection logic may select a locked cache line for eviction and/or unlocking (block 340) as will be described in detail below. The selected locked cache line is evicted (block 342), and the lock counter associated with the cache injection logic is decremented (block 344). As such, after evicting a locked cache line in block 342, the maximum number of cache lines are no longer locked, and the respective cache line may be injected and locked (blocks 330, 332), and the lock counter may be incremented (block 334).

Figure 9:
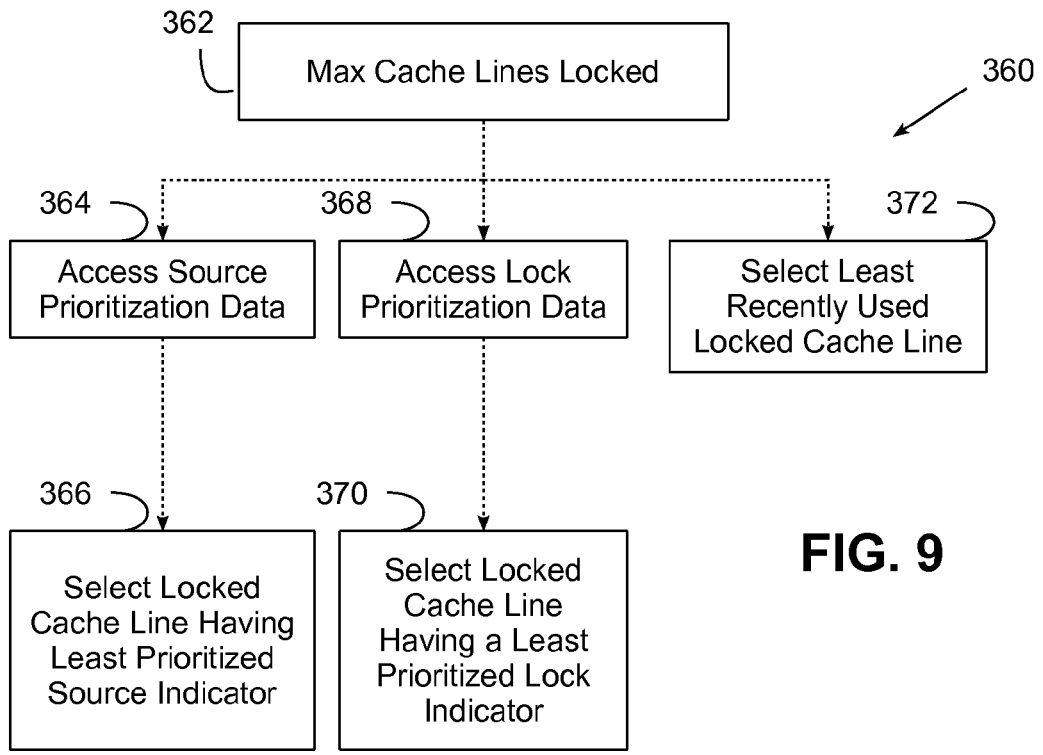
FIG. 9 is a flowchart illustrating a sequence of operations that may be performed by the processing unit of FIG. 5 to select a locked cache line in a cache memory of the processing unit for eviction.

FIG. 9 is a flowchart 360 illustrating a sequence of operations that may be performed by cache injection logic associated with a cache memory of a processing unit consistent with embodiments of the invention corresponding to block 340 of FIG. 9 to select a locked cache line for unlocking and/or eviction such that a new cache line may be injected and locked in the cache memory when a maximum number of cache lines are already locked in the cache memory. As such, the cache injection logic determines that the maximum number of cache lines in the cache memory are locked (block 362), and the cache injection logic selects a locked cache line for unlocking and/or eviction such that the new cache line may be injected and locked consistent with some embodiments of the invention.

As discussed herein, in some embodiments a source identifier may be included in communicated data that may be injected and locked. In some embodiments, a source identifier may be included in an injected cache line, or cache logic may maintain a reference data structure which includes a source identifier associated with each cache line stored in the cache memory. In some embodiments, the cache injection logic may maintain priority data indicating a priority of different source identifiers as compared to one another. In some embodiments, the cache injection logic may access the prioritization data to determine a priority of each locked cache line stored in the cache memory (block 364), and the cache injection logic may select a locked cache line to unlock and/or evict based on the source indicator associated with each locked cache line (block 366).

In some embodiments, the cache memory and/or injection logic may maintain for each cache line stored in the cache memory a software lock indicator and a cache injection lock indicator. As discussed, the cache injection lock for a cache line may be set to indicate that the cache line is locked when the cache line is injected, and the cache injection lock may be adjusted to indicate that the cache line is unlocked after the cache line has been processed by the processing unit. The software lock indicator may be configured to be set by a software thread and/or process executing on an execution unit of a processor, such that the process may lock one or more cache lines in the cache memory that the process will process in the near future. As such, these two lock indicators may be set in response to different events, and may indicate a different type of lock. In some embodiments of the invention, a priority of the software lock indicator as compared to the injection lock indicator may be maintained by the cache injection logic in prioritization data. In these embodiments, the cache injection logic may access such lock prioritization data to determine which lock indicator is of lower priority as compared to the other lock indicator (block 368). The cache injection logic may select a locked cache line for unlocking and eviction based on the priority of the particular lock indicator associated with each locked cache line (block 370).

In some embodiments, the cache injection logic may analyze the locked cache lines to determine a locked cache line of that was least recently used by an execution unit coupled to the cache memory. In these embodiments, the cache injection logic may select the least recently used locked cache line for unlocking and/or evicting (block 372). Other manners of selecting a locked cache line to evict will be appreciated by one of ordinary skill in the art having the benefit of the instant disclosure.

Figure 10:
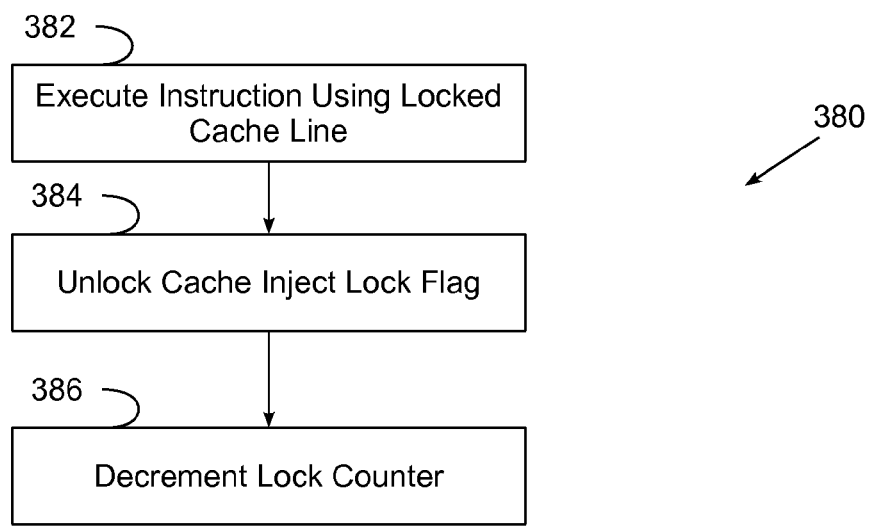
FIG. 10 is a flowchart illustrating a sequence of operations that may be performed by the processing unit of FIG. 5 to unlock a locked cache line in a cache memory associated with the processing unit after processing the cache line.

FIG. 10 is a flowchart 380 illustrating a sequence of operations consistent with embodiments of the invention that may be performed to unlock a cache line in the cache memory following processing the cache line. An execution unit coupled to the cache memory may execute an instruction using a respective cache line (i.e., the execution unit may process the respective cache line) (block 382). In response to processing the respective cache line, the cache injection logic may unlock the respective cache line (block 384), where unlocking includes adjusting an injection lock indicator maintained in the cache memory associated with the respective cache line to indicate that the respective cache line is unlocked. In response to unlocking the respective cache line, a lock counter maintained by the cache injection logic may be decremented (block 386).

Figure 11:
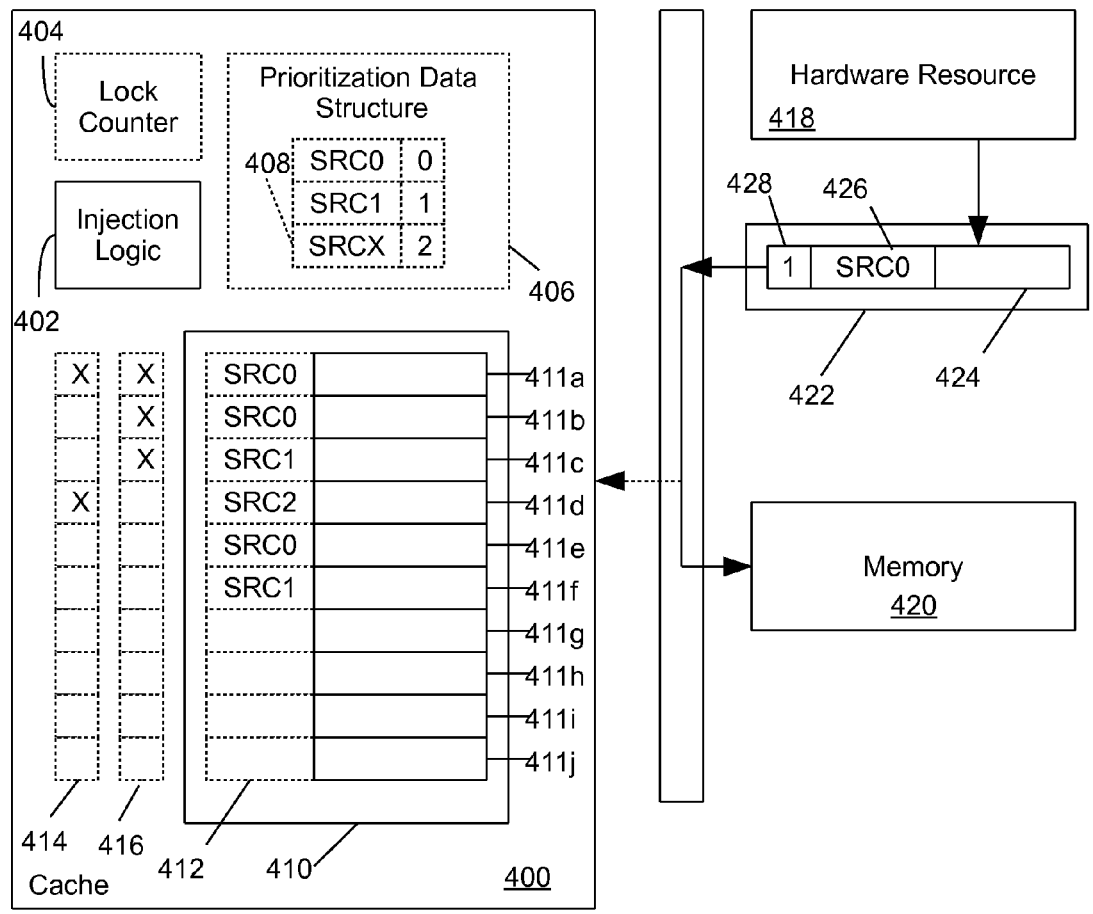
FIG. 11 is an exemplary block diagram illustrating an exemplary cache memory of the processing unit of FIG. 5 and illustrating an exemplary sequence of operations consistent with the flowcharts of FIGS. 7 and 8.

FIG. 11 is an exemplary block diagram illustrating a cache memory 400 consistent with some embodiments of the invention. Cache memory 400 may be implemented, for example, as an L2 cache, and includes cache injection logic 402 associated with the cache memory, a lock counter 404 that may be maintained by the cache injection logic 402 to indicate the number of locked cache lines stored in the cache memory 400. Consistent with some embodiments of the invention, the cache injection logic 402 may maintain prioritization data indicating a priority for one or more source identifiers, where the source identifiers correspond to hardware resources. In this exemplary embodiment, the cache memory 400 includes a prioritization data structure 406, where the prioritization data structure 406 stores prioritization data in a priority table 408. The priority table 408 includes a data entry for one or more source indicators which indicates a priority value associated with the source indicator, and in this example, the priority table 408 includes an entry for source identifiers 'SRC0', 'SRC1', and 'SRC2' and includes a priority value of '0', '1', '2'. For this exemplary block diagram, a lower value for a priority value indicates that the source identifier has a higher priority. Hence, the source identifier 'SRC0' has the highest priority value '0' indicating that data cache lines from the hardware resource corresponding to 'SRC0' should be prioritized over data cache lines from hardware resources corresponding to source identifiers 'SRC1' and 'SRCX'. In addition, the source identifier 'SRCX' may be considered a default configuration, which indicates a default priority value for cache lines from hardware resources other than 'SRC0' or 'SRC1'.

Cache memory 400 may include a cache data structure 410 storing cache lines 411a-j. In addition, a source identifier 412 may be maintained for each stored cache line 411a-j, where the source identifier 412 may correspond to a hardware resource from which the cache line 412a-j was communicated. Furthermore, a software lock indicator 414 may be maintained for each cache line 411a-j in the cache memory, where the software lock indicator indicates whether a corresponding cache line 411a-j is locked by an process executing on an execution unit coupled to the cache memory 400. As such, an execution unit may execute an instruction for a process to set a respective software lock indicator 414 for a respective stored cache line 411a-j. An injection lock indicator 416 may also be maintained for each stored cache line 411a-j, where the injection lock indicator 416 indicates that the corresponding cache line 411a-j is locked. The injection lock indicator 416 for a respective cache line 411a-j may be adjusted by the cache injection logic 402 consistent with embodiments of the invention.

While in the exemplary embodiment, the lock counter 404, prioritization data structure 406, source identifiers for each cache line 412, software lock indicator 414, and injection lock indicator 416 are illustrated in cache memory 400, the invention is not so limited. In some embodiments, one or more of the components may be stored in data structures located in one or more memory locations accessible by the cache injection logic 402, and not necessarily resident in the cache memory.

As shown in the exemplary block diagram, a hardware resource 418 may be coupled to the cache memory 400 and a main memory 420. In this example, hardware resource 418 communicates data 422 including a respective cache line 424 to the main memory 420. Cache memory 400 and cache injection logic 402 are configured to monitor data communicated from hardware resource 418 to memory 420 to determine if the one or more cache lines of the communicated data may be injected into the cache memory 400. The data 422 communicated to memory 420 may include a source identifier 426 associated with the respective cache line 424, indicating that the data was communicated from the hardware resource 418. In this example, the source indicator 'SRC0' corresponds to the hardware resource 418. Furthermore, the communicated data 422 may include cache injection enable data 428, indicating whether the communicated data 422 is of the type that may be cache injected. In this example, the cache injection enable data 428 includes a value '1' which for exemplary purposes indicates that the communicated data 422 is appropriate for cache injection.

Consistent with some embodiments of the invention, the cache injection logic 402 may snoop the communicated data 422 to determine whether to inject and lock the respective cache line 424 in the cache memory 400. In some embodiments, the cache injection logic 402 may analyze the cache injection enable data 428 to determine whether the communicated data 422 includes data appropriate for injection, e.g., the respective cache line 424. In some embodiments, the cache injection logic 402 may analyze the source identifier 426 included in the communicated data 422 to determine whether the communicated data includes data appropriate for cache injection into the cache memory.

For exemplary purposes, the prioritization data structure 406 includes prioritization data in a priority table 408 indicating a priority order for some source identifiers, and as indicated in the prioritization data, the source identifier corresponding to the hardware resource 418 'SRC0' is the highest priority source indicator in the system. In this example, if the cache injection logic is configured to determine that the respective cache line 424 is appropriate for injection based on the source identifier 426 included in the communicated data, the respective cache line 424 may be prioritized over cache lines associated with hardware resources having source identifiers other than 'SRC0'. As such, if the cache injection logic determines that a maximum number of cache lines 411a-j in the cache memory 400 are locked based on the software lock indicators 414, the injection lock indicators 416 and/or the lock counter, such that the respective cache line may not be injected without unlocking and/or evicting a first cache line of the plurality of locked cache lines 411a-d, the cache injection logic may select the first cache line for unlocking and/or eviction as the locked cache line associated with the source indicator 'SRC2' 411d. As indicated by the prioritization data in the priority table 408, the default priority associated with source indicators not specifically listed (i.e., 'SRCX') in the priority table 408 is the lowest priority. As such, in this exemplary embodiment, a locked cache line may be unlocked and/or evicted from the cache memory in response to determining to inject a higher priority cache line in the cache memory 400, where the priority of cache lines may be determined based on a source identifier associated with each cache line and prioritization data maintained by the cache injection logic 402.

In another example, in response to determining that a maximum number of cache lines are locked in the cache memory 400, the cache injection logic may select a locked cache line for unlocking and/or eviction based the software lock indicator 414 and the injection lock indicator 416. In this exemplary embodiment, each type of lock indicator may have a priority associated therewith relative to the other lock indicator, and the cache injection logic 402 may select a first cache line of the plurality of locked cache lines 411a-d for unlocking and/or eviction based on the type of lock indicator associated with the locked cache line 411a-d. For example, the software lock indicator 414 may be of a lower priority than the injection lock indicator 416, and as such, the cache injection logic 402 may select a cache line associated with only a software lock indicator 416, e.g., cache line 411d.

In some embodiments, a priority associated with a cache line may be based on a type of lock indicator associated with the cache line and a source indicator associated with the cache line. In some embodiments, the cache injection logic may determine whether to unlock a locked cache line or unlock and evict a locked cache line based on the number of available cache lines in a cache memory for storage.

It will be appreciated that for set associative cache memories, it may be desirable in some embodiments to limit the number of locked cache lines on a set-by-set basis, rather than across the full cache memory. For example, it may be desirable in a four way set associative cache to allow a maximum of two or three cache lines in any given set to be locked, such that at least a portion of each set is reserved for normal (non-cache injection locked) cache lines. In addition, it will be appreciated that the aforementioned eviction algorithms for evicting locked cache lines are typically incorporated into, or are otherwise supplemental to, standard cache eviction logic algorithms that prioritize the eviction of unlocked cache lines over locked cache lines, and primarily serve to select a cache line for eviction when no unlocked cache lines are otherwise suitable candidates for eviction.

Therefore, embodiments of the invention implement cache injection for cache memory units including configurable injection and locking by managing cache injection and locking with injection logic associated with the cache memory. Moreover, prioritization data maintained by the cache injection logic may be configured to reduce memory bandwidth requirements associated with retrieving data from a memory to a cache memory for processing.

While the invention has been illustrated by a description of the various embodiments and the examples, and while these embodiments have been described in considerable detail, it is not the intention of the applicants to restrict or in any other way limit the scope of the appended claims to such detail. For example, the blocks of any of the flowcharts may be reordered, processed serially and/or processed concurrently without departing from the scope of the invention. Moreover, any of the flowcharts may include more or fewer blocks than those illustrated consistent with embodiments of the invention.

Additional advantages and modifications will readily appear to those skilled in the art. Thus, the invention in its broader aspects is therefore not limited to the specific details, representative apparatus and method, and illustrative example shown and described. In particular, any of the blocks of the above flowcharts may be deleted, augmented, made to be simultaneous with another, combined, or be otherwise altered in accordance with the principles of the invention. Accordingly, departures may be made from such details without departing from the spirit or scope of applicants' general inventive concept.

What is claimed is:

1. A method for storing data in a network on a chip (NOC) processing unit, the method comprising:
    in a first node that includes an integrated processor block including an execution unit and a cache memory coupled to the execution unit, maintaining, for each cache line among a plurality of cache lines stored in the cache memory, each of a software lock flag and a cache inject lock flag associated with said each cache line, wherein the first node is among a plurality of nodes coupled to one another via an on-chip network;
    in response to detecting communication of a respective cache line from an input/output (I/O) device to a first memory coupled to the on-chip network, determining whether a maximum number of cache lines in the cache memory are cache inject locked by accessing a cache lock counter associated with the cache memory;
    in response to determining that the maximum number of cache lines are not cache inject locked, performing a cache inject and lock operation by injecting the respective cache line in the cache memory concurrently with communication of the respective cache line to the first memory and automatically locking the respective cache line, wherein locking the respective cache line includes setting the cache inject lock flag for the respective cache line and incrementing the cache lock counter, and wherein setting the cache inject lock flag locks the respective cache line from being evicted from the cache memory.

2. The method of claim 1, further comprising: in response to determining that the maximum number of cache lines are locked, writing the respective cache line to the first memory without injecting the respective cache line into the cache memory.

3. The method of claim 1, further comprising: in response to determining that the maximum number of cache lines are locked, injecting the respective cache line into the cache memory without locking the respective cache line.

4. The method of claim 1, further comprising:
    in response to determining that the maximum number of cache lines are locked, evicting a least recently used cache line stored in the cache memory.

5. A method for storing data in a processing unit including an execution unit and a cache memory coupled to the execution unit, the cache memory configured to store a plurality of cache lines, the method comprising:
    maintaining, for each cache line stored in the cache memory, a software lock flag and a cache inject lock flag associated with a cache line;
    in response to detecting communication of a respective cache line from an input/output (I/O) device to a first memory coupled to the processing unit, determining whether to inject and lock the respective cache line in the cache memory; and in response to determining to inject and lock the respective cache line in the cache memory, performing a cache inject and lock operation using cache injection logic coupled to the cache memory to inject the respective cache line in the cache memory concurrently with communication of the respective cache line to the first memory and automatically lock the respective cache line, wherein locking the respective cache line locks the respective cache line from being evicted from the cache memory.

6. The method of claim 5, wherein determining whether to inject and lock the respective cache line includes determining whether a maximum number of cache lines in the cache memory are locked.

7. The method of claim 6, further comprising unlocking and evicting a first cache line stored in the cache memory in response to determining that the maximum number of cache lines in the cache memory are locked.

8. The method of claim 7, wherein each cache line stored in the cache memory includes a source identifier, and wherein unlocking and evicting the first cache line is based at least in part on the source identifier of the first cache line.

9. The method of claim 8, wherein the cache injection logic maintains prioritization data indicating an injection and lock priority of one or more source identifiers relative to one another, and wherein unlocking and evicting the first cache line is based at least in part on the prioritization data.

10. The method of claim 9, wherein the prioritization data indicates a default injection and lock priority for source identifiers not included in the prioritization data, and wherein unlocking and evicting the first cache line is based at least in part on the default injection and lock priority.

11. The method of claim 7, wherein the software lock flag is configured to be set by a software thread executing on the processing unit, wherein locking the respective cache line includes setting the cache inject lock flag for the respective cache line, and wherein unlocking and evicting the first cache line in the cache memory is based at least in part on the cache inject lock flag and the software lock flag of the first cache line.

12. The method of claim 6, further comprising determining not to inject and lock the respective cache line in the cache memory in response to determining that the maximum number of cache lines are locked.

13. The method of claim 12, further comprising injecting the respective cache line in the cache memory without locking the respective cache line in response to determining not to inject and lock the respective cache line in the cache memory.

14. The method of claim 5, wherein the communication includes an injection indicator indicating whether cache injection should be performed for the respective cache line, and wherein determining whether to inject and lock the respective cache line of the data in the cache memory is based at least in part on the injection indicator.

15. The method of claim 5, wherein the communication includes a source identifier indicating a source hardware resource coupled to the processing unit that generated the data, and wherein determining whether to inject and lock the respective cache line of the data in the cache memory is based at least in part on the source identifier.

16. The method of claim 5, wherein the processing unit is a first processing unit among a plurality of processing units, wherein the first memory comprises a main memory coupled to the plurality of processing units over a shared bus or network, wherein the cache memory comprises an L2 cache memory dedicated to the first processing unit, and wherein the method further comprises:
  monitoring the shared bus or network to detect communication of the respective cache line to the main memory from an input/output (I/O) device coupled to the shared bus or network; and
  storing the cache line in the main memory in parallel with injecting the respective cache line in the cache memory and locking the respective cache line.

17. A circuit arrangement comprising:
  a processing unit;
  a cache memory coupled to the processing unit and configured to store a plurality of cache lines, wherein the cache memory is configured to maintain, for each cache line stored in the cache memory, a software lock indicator and a cache inject lock indicator associated with a cache line; and
  cache injection logic coupled to the cache memory, the cache injection logic configured to, in response to detection of a communication of a respective cache line from an input/output (I/O) device to a first memory coupled to the processing unit, determine whether to inject and lock the respective cache line in the cache memory, wherein the cache injection logic is further configured to perform a cache inject and lock operation to inject the respective cache line in the cache memory concurrently with communication of the respective cache line to the first memory and automatically lock the respective cache line in response to determining to inject and lock the respective cache line in the cache memory, wherein locking the respective cache line locks the respective cache line from being evicted from the cache memory.

18. The circuit arrangement of claim 17, wherein the cache injection logic is configured to determine whether to inject and lock the respective cache line by determining whether a maximum number of cache lines in the cache memory are locked.

19. The circuit arrangement of claim 18, wherein the cache injection logic is further configured to unlock and evict a first cache line of a plurality of locked cache lines stored in the cache memory in response to determining that the maximum number of cache lines in the cache memory are locked.

20. The circuit arrangement of claim 19, wherein the cache memory is configured to maintain a source identifier for each cache line stored in the cache memory, and wherein the cache injection logic is configured to unlock and evict the first cache line based at least in part on the source identifier associated with the first cache line.

21. The circuit arrangement of claim 19, wherein the cache injection logic is configured to lock the respective cache line by adjusting the cache inject lock indicator for the respective cache line, and wherein the cache injection logic is configured to unlock and evict the first cache line based at least in part on the software lock indicator and the cache injection lock indicator.

22. The circuit arrangement of claim 17, wherein the cache injection logic is configured to inject the respective cache line in the cache memory without locking the respective cache line in response to determining not to inject and lock the respective cache line in the cache memory.

23. The circuit arrangement of claim 17, further comprising:
  a plurality of processing units, wherein the processing unit is a first processing unit among the plurality of processing units, and wherein the cache memory comprises an L2 cache memory dedicated to the first processing unit;
  a shared bus coupling the plurality of processing units to the first memory, wherein the first memory comprises a main memory accessible by the plurality of processing units; and
  an I/O device coupled to the shared bus and configured to communicate the respective cache line to the main memory;
  wherein the cache injection logic is configured to detect communication of the respective cache line to the main memory by monitoring the shared bus, and to inject the respective cache line in the cache memory and lock the respective cache line in parallel with the respective cache line being stored in the main memory.

24. An integrated circuit device comprising the circuit arrangement of claim 17.

* * * * *